United States Patent [19]

Freitas et al.

[11] Patent Number: 5,321,542
[45] Date of Patent: Jun. 14, 1994

[54] CONTROL METHOD AND APPARATUS FOR WIRELESS DATA LINK

[75] Inventors: Richard F. Freitas, Morgan Hill, Calif.; Colin G. Harrison, Brookfield, Conn.; Peter D. Hortensius, Goldens Bridge, N.Y.

[73] Assignee: International Business Machines Corporation, Armonk, N.Y.

[21] Appl. No.: 148,190

[22] Filed: Nov. 8, 1993

Related U.S. Application Data

[63] Continuation of Ser. No. 605,586, Oct. 29, 1990, abandoned.

[51] Int. Cl.$^5$ .............................................. H04B 10/00
[52] U.S. Cl. ................................... 359/172; 359/113; 359/152; 370/84
[58] Field of Search ............... 359/113, 114, 123, 124, 359/125, 126, 135, 136, 137, 144, 152, 153, 159, 161, 165, 172; 370/84; 340/825.54

[56] References Cited

U.S. PATENT DOCUMENTS

| | | | |
|---|---|---|---|
| 4,259,746 | 3/1981 | Sandstedt | 359/172 |
| 4,402,090 | 8/1983 | Gfeller et al. | |
| 4,574,305 | 3/1986 | Campbell et al. | 359/112 |
| 4,805,167 | 2/1989 | Leslie et al. | 370/84 |
| 4,807,222 | 2/1989 | Amitay | 359/136 |
| 4,809,257 | 2/1989 | Gantenbein et al. | 359/136 |
| 4,826,742 | 10/1989 | Vacon et al. | 455/66 |
| 4,884,266 | 11/1989 | Pflaumer | 370/84 |
| 4,931,250 | 6/1990 | Greszczuk | 375/8 |
| 5,029,183 | 7/1991 | Tymes | |

FOREIGN PATENT DOCUMENTS

| | | |
|---|---|---|
| 0362790A2 | 4/1990 | European Pat. Off. |
| 2101828A | 1/1983 | United Kingdom |
| 2226729A | 7/1990 | United Kingdom |

OTHER PUBLICATIONS

"Infrared Microbroadcasting Network For In-House Data Communication", IBM Technical Disclosure Bulletin, Vo. 24, No. 8, Jan., 1982, by F. Gfeller.
"Wireless Connection Between A Controller And A Plurality Of Terminals", by F. Closs et al. IBM Technical Disclosure Bulletin, vol. 20, No. 7, Dec. 1977.
7th European Conference on Optical Communication Sep. 1981, Copenhagen DK pp. P27-1-P27-4 GFeller 'infrared microbroadcasting network for in-house data communications'.

*Primary Examiner*—Donald O. Woodiel
*Assistant Examiner*—Rafael Bacares
*Attorney, Agent, or Firm*—Perman & Green

[57] ABSTRACT

Methods and apparatus for operating an optical communications system having at least two communicating entities (10,12). In accordance with a method of the invention a first step transmits communication link control information from a first entity to a second entity over a first optical channel having a first data bit rate. Responsive to the transmitted communication link control information, a second step of the method transmits data information from the second entity to the first entity over a second optical channel having a second data bit rate that is greater than the first data bit rate. The first optical channel is preferably a relatively low-bandwidth diffuse transmission infrared radiation channel. The second optical channel is preferably a relatively high-bandwidth infrared channel. One of the entities is a network adapter coupled to a wired network. The network adapter is preferably ceiling mounted. The other entity may be a mobile data processor. A plurality of mobile data processors may be served by one network adapter.

26 Claims, 3 Drawing Sheets

CONTROL METHOD AND APPARATUS FOR WIRELESS DATA LINK

This is a continuation of copending application Ser. No. 07/605,586, filed on Oct. 29, 1990, now abandoned.

FIELD OF THE INVENTION

This invention relates generally to data communication apparatus and method and, in particular, to a wireless communication system that employs a high speed data channel and a separate, lower speed diffuse transmission control channel for communicating information between one or more remote stations and a base station. In a preferred embodiment the remote stations are mobile, handheld workstations bidirectionally coupled to the base station(s) through an infrared radiation signal carrier.

BACKGROUND OF THE INVENTION

A wireless data link provides a reliable, robust, and efficient means of transporting blocks of data from a mobile or handheld data processing workstation to a header or base station. The base station may be attached to a wired Local Area Network (LAN), such as an Ethernet network, and forms a connection into the LAN. The mobile workstation may employ standard, high-level network protocols, such as TCP/IP, to access the LAN. From the point of view of an operating system and application, programs running on the workstation transport over the wireless link occurs transparently.

Such a mobile wireless link, particularly one that employs infrared (IR) light as a communication medium, presents a communications reliability problem that is distinct from the problem of data transmission errors occurring at the bit level. As the mobile workstation is moved, or as optically opaque objects in the environment of the workstation move, the reception of optical signals transmitted between the mobile unit and the one or more base stations may be interrupted, strongly reduced by "shadowing" or corrupted by multi-path effects. Such an optical wireless link cannot therefore be treated as a reliable medium and specific provisions must be made for dealing with the inherent unreliability.

It is particularly desirable to avoid deadlock situations such as might arise when a connection is lost during a transaction. These can be resolved by timeout mechanisms, but this technique becomes burdensome if disconnection events occur frequently.

Problems related to signal processing and clock and bit recovery become progressively worse as the bandwidth of the wireless link is increased. This is due at least in part to admitting more noise into the receiver as a band-limiting filter is made wider and is also due to a need to compensate for inter-symbol interference as the data bit width approaches the rms delay spread of the multiple paths.

In IBM Technical Disclosure Bulletin, Vol. 20, No. 7, December 1977 F. Closs et al. describe the use of diffuse transmission of infrared signals for wireless communications between a controller and a plurality of terminals. Indirect links rely on infrared radiation that is diffusely scattered from walls and ceilings- The use of different wavelengths or different carrier frequencies is disclosed for separating channels.

In IBM Technical Disclosure Bulletin, Vol. 24, No. 8, page 4043, January 1982 F. Gfeller describe general control principles of an infrared wireless network incorporating multiple ceiling mounted transponders that couple a host/controller to multiple terminal stations. A downlink infrared channel operates at 200 kHz and an uplink infrared channel operates at 400 kHz. Access to the uplink channel is controlled by a Carrier Sense Multiple Access/Collision Detection (CSMA/CD) method.

In commonly assigned U.S. Pat. No. 4,402,090, issued Aug. 30, 1983, F. Gfeller et al. describe an infrared communication system that operates between a plurality of satellite stations and a plurality of terminal stations. A host computer communicates with the terminal stations via a cluster controller and the satellite stations, which may be ceiling mounted. Communication with the terminal stations is not interrupted even during movement of the terminal stations. In a disclosed embodiment a carrier frequency for the infrared link is 100 kHz and a data speed is 50 k Bit/s. Wired communication between the satellite and the cluster controller occurs at 1M Bit/s.

What is not taught by the prior art is the provision of a robust control channel that is separate from a data channel. The utility of such a separate control channel becomes apparent from propagation studies of infrared links operating at high bandwidths (>10M Bits/s). These studies indicate that it may be difficult to sustain a continuously reliable link at such high bandwidths. Thus, if a control dialogue is also communicated over such a high-speed link frequent disconnections of the mobile workstation from the network can be expected to occur, resulting in an excessive overhead due to re-establishing the connection.

However, relatively low bandwidth links (<50 k Bits/s) have been found to be extremely robust. That is, diffuse infrared propagation renders low bandwidth links less susceptible to loss of data.

It is therefore an object of the invention to provide a reliable and efficient infrared data communications network.

It is another object of the invention to provide an optical communication system that includes a separate control channel that has a lower bandwidth than a data channel.

It is a further object of the invention to provide an infrared communication system with a diffuse propagation channel for implementing a low-bandwidth control channel that is separate from a higher-bandwidth data transmission channel.

SUMMARY OF THE INVENTION

The foregoing and other problems are overcome and the objects of the invention are realized by methods and apparatus for operating an optical communications system having at least two communicating entities. In accordance with a method of the invention a first step transmits communication link control information from a first entity to a second entity over a first optical channel having a first data bit rate. Responsive to the transmitted communication link control information, a second step of the method transmits data information from the second entity to the first entity over a second optical channel having a second data bit rate that is greater than the first data bit rate.

The first optical channel is preferably a relatively low-bandwidth diffuse transmission infrared radiation channel. The second optical channel is preferably a relatively high-bandwidth infrared channel. One of the entities is a network adapter coupled to a wired network. The network adapter is preferably ceiling mounted. The other entity may be a mobile data processor.

In accordance with an embodiment of the invention the second optical channel transmits with a modulation spectrum within a range of approximately 400 kHz to approximately 10 MHz. That is, the second optical channel may be a high speed line-of-sight channel. The first optical channel transmits with a modulation spectrum within a range of approximately 2 kHz to approximately 300 kHz and relies on diffuse transmission from walls and ceilings within the environment to achieve a robust and reliable control channel that is separate from the higher speed and inherently less reliable data channel.

BRIEF DESCRIPTION OF THE DRAWING

The above set forth and other features of the invention are made more apparent in the ensuing Detailed Description of the Invention when read in conjunction with the attached Drawing, wherein:

FIG. 1b is a block diagram of the base station of FIG. 1a;

FIG. 1c is a block diagram of the mobile unit of FIG. 1a;

DETAILED DESCRIPTION OF THE INVENTION

Figure 1A:
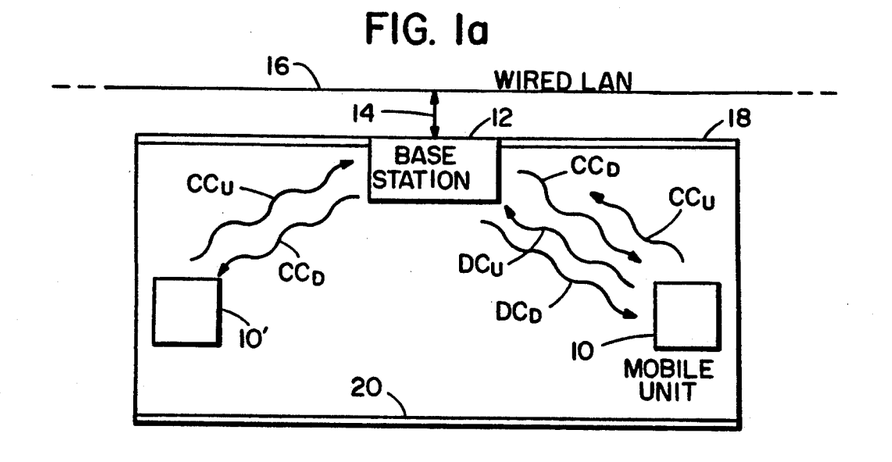
FIG. 1a is a block diagram showing a plurality of mobile units communicating with a base station.

FIG. 1a depicts an embodiment of the invention wherein a mobile workstation, or data processing unit 10, is in bidirectional communication with a network adapter, or base station 12, over an optical radiation communications channel. The base station 12 is coupled via a connector 14 to a wired local area network (LAN) 16. As shown the base station 12 is disposed within or adjacent to a ceiling 18 and the mobile unit 10 is carried or is otherwise transported over a floor 20. Of course, the mobile unit 10 may be used in a stationary manner if desired. Ceiling mounting is not required for the base station 12 so long as there exists a substantially uncluttered transmission path between the base station 12 and the associated mobile unit or units 10.

In accordance with the invention communication between the mobile unit 10 and the base station 12 is accomplished through two discrete optical channels. Specifically, there is provided a relatively low-bandwidth, for example 50 k Bits/s, command channel (CC) and a relatively higher-bandwidth, for example 1 M Bit/s or higher, data channel (DC). An uplink command channel ($CC_U$), uplink being from the mobile unit 10 to the base station 12, has a carrier frequency or wavelength that is offset from a downlink command channel ($CC_D$), downlink being from the base station 12 to the mobile unit 10, by an amount sufficient to prevent collisions between uplink and downlink command messages. Similarly, an uplink data channel ($DC_U$) has a carrier frequency or wavelength that is offset from a downlink data channel ($DC_D$) by an amount sufficient to prevent collisions between uplink and downlink data messages.

The communications channels are carried via an infrared (IR) data link having a preferred wavelength of approximately 1.4 microns, although presently available optical devices readily provide for operation within the range of approximately 750 nanometers to approximately 1000 nanometers. In accordance with the invention the command channel is carried by a diffuse transmission lower bit-rate channel while the data channel is conveyed by a line-of-sight higher bit-rate channel. This permits the control channel of a mobile unit 10, including one that is just coming within range of a base station 12, to establish communication with the base station 12 and also possibly through a network to a host system, before reliable communication becomes feasible on the higher frequency data channel. The result is the provision of a reliable and efficient infrared data communications network, which is one expressed object of the invention.

Figure 1B:
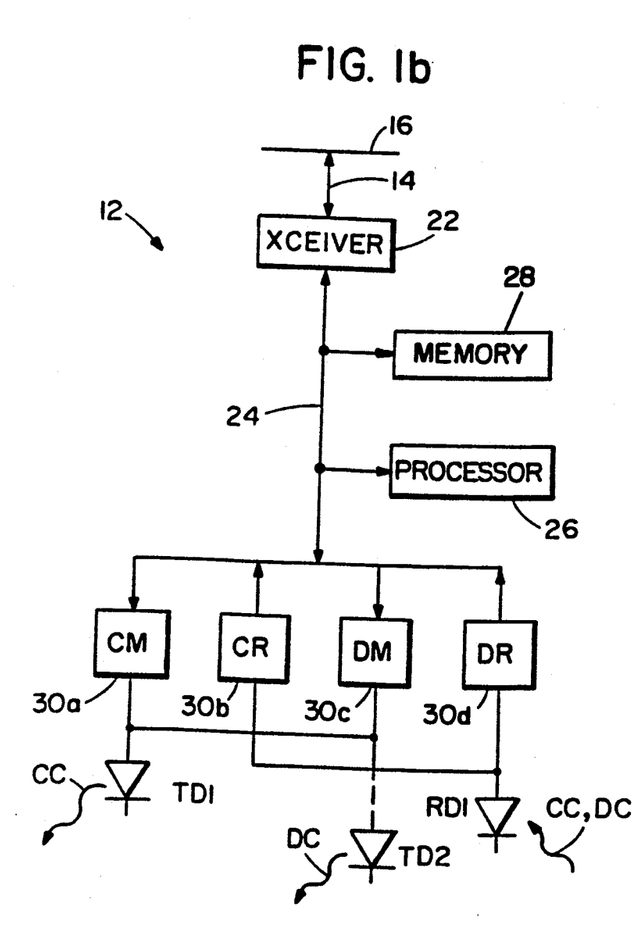

Referring to FIG. 1b there is shown a simplified block diagram of the base station 12. The base station 12 is coupled to the LAN 16 via the connector 14. Connector 14 is coupled to a network adapter transceiver 22 which in turn is coupled to an internal bus 24. The base station 12 includes a processor 26 that is bidirectionally coupled to a memory 28 that stores program-related and other data, including packets of data transmitted to or received from the mobile units 10. Processor 26 also communicates with a plurality of modulators and receivers, specifically a control modulator 30a, a control receiver 30b, a data modulator 30c and a data receiver 30d. These IR modulators and receivers have inputs coupled to suitable infrared emitting or receiving devices such as laser diodes, LEDs and photodetectors. In the illustrated embodiment the control modulator 30a and the data modulator 30c both have an output coupled to a transmit diode 1 (TD1). In an alternate embodiment described below the data modulator 30c is not coupled to the TD1 but is instead coupled to a second transmit diode (TD2).

Figure 1C:
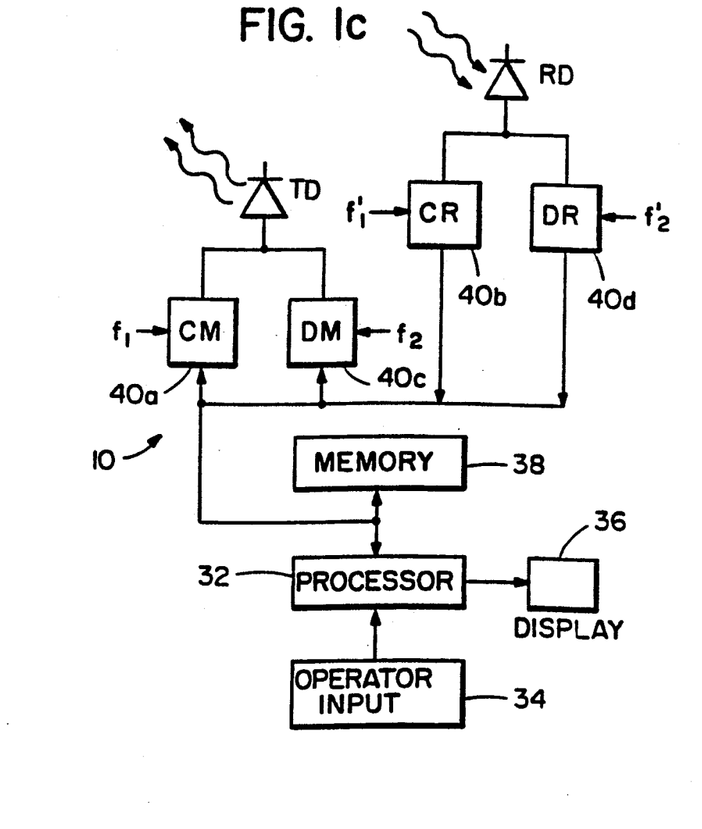

Referring now to FIG. 1c there is shown in block diagram form the mobile unit 10. Mobile unit 10 includes a processor 32 coupled to an operator input device 34 and also coupled to an operator display device 36. Operator input device 34 may be a keyboard or any suitable data entry means. Similarly, operator display device 36 may be a flat panel alphanumeric display or any suitable display means. Also coupled to processor 32 is a memory 38 that stores program-related data and other data, such as packets of information received from or intended to be transmitted to the base station 12 and also an identification of the mobile unit 10. Also coupled to processor 32 are a plurality of command and data modulators and receivers 40a-40d. In FIG. 1c it can be seen that the command modulator 40a (uplink) is provided with a first frequency $f_1$ while the command receiver 40b (downlink) is provided with a second frequency $f_1'$ that is offset from $f_1$. Similarly, it can be seen that the data modulator 40c (uplink) is provided with a first frequency $f_2$ while the data receiver 40d (downlink) is provided with a second frequency $f_2'$ that is offset from $f_2$. The data receivers of FIGS. 1b and 1c include demodulators and filters and operate in a conventional manner to extract the modulated bit stream from the received optical signals. Similarly, the modulators of FIGS. 1b and 1c operate in a conventional manner to modulate the optical output in accordance with a transmitted bit stream.

In the embodiment of FIG. 1c both the command and data uplink information is transmitted via one transmit LED (TD) while the downlink command and data information is received by one receive photodetector (RD). If desired, separate transmit LEDS and receive photodetectors could be used for separately transmitting and receiving the control and the data information.

The wired LAN 16 may conform to any suitable network configuration. One suitable network protocol is known as TCP/IP, as described in detail in "Internetworking with TCP/IP Principles, Protocols, and Architectures" by Douglas E. Comer, Prentice Hall, N.J., 1988.

By example, the high bandwidth downlink data channel may operate at a wavelength of 900 nm and the uplink data channel may operate with a wavelength of 750 nm. Maximum output optical power for both is one Watt for a range of approximately five meters at a bit rate of from one to 10 Mbits/sec. The respective modulators may employ on-off pulsing, multi-carrier modulation or direct sequence spread spectrum modulation (DSSS), with the receivers including corresponding demodulating circuitry. DSSS is described in "Spread Spectrum in Communications", by Marvin K. Simon, Computer Science Press, Rockville, Md. (1985).

Also by example, the low bandwidth downlink control channel may operate at a wavelength of 900 nm and the uplink control channel may operate with a wavelength of 750 nm. Output power for both is 10 mW for a range of 10 meters at a bit rate of 50 Kbits/sec. Manchester coding may be employed to obtain a DC null and modulation is preferably on-off although other techniques may also be employed.

Figure 2:
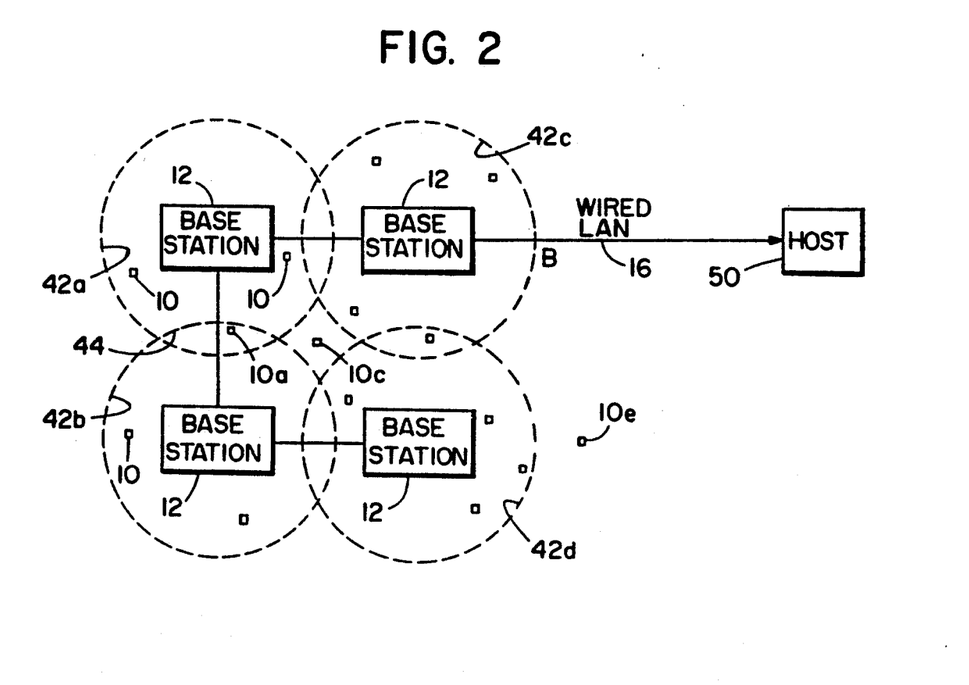
FIG. 2 shows a plurality of overlapping base station communication cells.

FIG. 2 illustrates a plurality of the base stations 12 each of which is coupled to a wired LAN 16 which in turn is coupled to a host data processing system 50. The base stations 12 are disposed such that substantially symmetrical optical fields (42a–42d) associated with each are overlapping. Thus, it can be seen that certain of the plurality of mobile units 10 are contained wholly within a single one of the fields while the mobile unit 10a is disposed within an overlapping region 44 between the fields 42a and 42b. The mobile unit 10c is disposed within a region not covered by any of the base stations 12. During use, the mobile units 10 can be expected to move about within a given region and to travel from one region to another.

Figure 3:
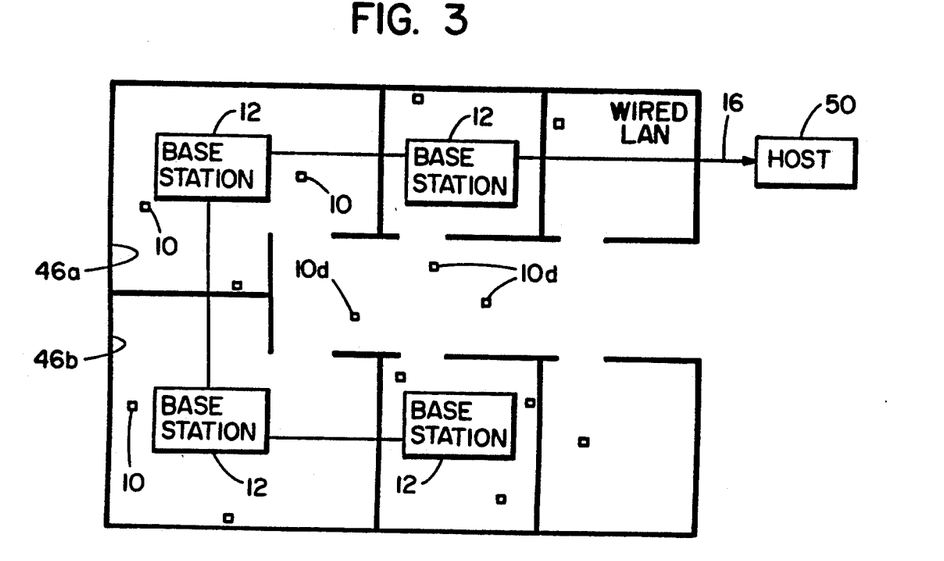
FIG. 3 shows a plurality of base stations disposed in separate rooms and not having overlapping coverage areas.

FIG. 3 illustrates another embodiment wherein the plurality of base stations 12 are each disposed within a separate enclosure or room (46a, 46b). In this embodiment there is no overlap between base station fields. So long as a mobile unit is within a room it is in communication with the associated base station 12. However, for those mobile units 10d which are illustrated to be within a hallway communication may be possible if properly aligned with a doorway or other opening into the enclosed area served by the base station 12.

Figure 4:
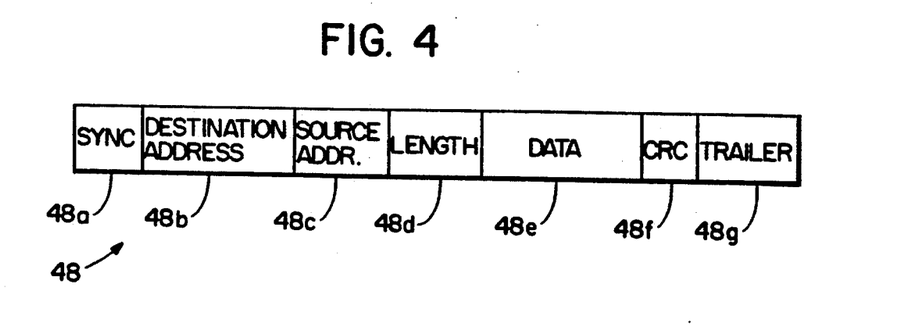
FIG. 4 shows one embodiment of a transmission packet that is suitable for communicating command and data information between the mobile units and a base station.

Communication is preferably achieved by Time Division Multiple Access (TDMA) technique wherein a plurality of slots make up a frame. The frames are repeatedly transmitted and a given mobile unit 10 is assigned one or more specific slots within which to transmit or receive information. FIG. 4 illustrates one suitable slot 48 format that is similar to that disclosed in the before mentioned commonly assigned U.S. Pat. No. 4,402,090. Specifically, a slot delimiter or synchronization (SYNC) field 48a is followed by a destination address field 48b and a source address field 48c. For an uplink message the destination address would be that of a base station 12 while the source address would be that of the transmitting mobile unit 10. In this regard each of the mobile units is assigned an identifier or address that typically corresponds to a network address. The mobile unit 10 addresses may be hardwired or otherwise preassigned. Preferably, the addresses are dynamically assigned when communication is established between the network and the mobile unit 10.

A next slot 48 field is a length field 48d which gives the length in bytes of the following data field 48e. For a command slot the data field will typically be substantially smaller than a data field 48e associated with a data slot. Following the data field 48e is a data integrity field, typically a CRC field 48f. A further slot delimiter is provided by a trailer field 48g. It should be realized that this format is exemplary only and that a number of suitable formats can be devised. For example, similar results can be achieved through the use of the before mentioned DSSS modulation.

Each slot on the wireless link may be a re-packetized frame of the wired network protocol, for example, TCP/IP. The destination address field 48b is the address of the base station 12, possibly but not necessarily its IP address. The source address field 48c is either the base station 12 address (downlink) or the mobile unit 10 address (uplink), also possibly but not necessarily the mobile unit's IP address.

In the optical communication system of the invention all wireless communication is between the base station 12 and the mobile units 10. There is no direct communication between the mobile units 10. The slotted TDMA method is employed for transmission in each direction. Frames of slots 48 are passed to or from mobile units 10 which are allocated specific slots according to an arbitration scheme performed by the base station 12.

The mobile wireless network thus far described must provide both media access control and data link control.

Media access control relates to arbitration among the group of mobile units 10 for uplink access to the wireless medium of the infrared data link. Control requirements are asymmetric with respect to the uplink and the downlink channels. In the system of the invention the uplink and downlink are carried on separate optical wavelengths, thus avoiding collision.

Typical control events that are conveyed between the mobile unit 10 to the base station 12 upon the lower bandwidth $CC_U$ channel may include, but are not limited to, the following.

a) Establishment of connection with the base station 12, that is, becoming a member of the base unit's mobile unit group.

b) Authentication of the mobile unit's identity.

c) Request for access to the medium, when the mobile unit 10 has one or more slots to transmit. This involves an arbitration performed by the base station 12 among those members of the associated mobile unit group having slots to transmit. These mobile units may also be referred to as "active members".

d) Deletion of access to the medium at the end of a transmission or if the mobile unit 10 "disappears" or disconnects.

e) Control of optical power or of data transmission rates to accommodate a close approach to the base station 12 by the mobile unit 10 or to permit lowered transmission rates when the signal path is shadowed. By example, it may be desirable to reduce transmitted power within a certain radius of the base station 12 in order to prevent overdriving the CR 30b.

f) Allocation of slot 48 for the uplink data transmission.

g) Re-transmission of uplink slots found to have transmission errors.

h) A request to the mobile unit 10 to temporarily suspend transmission.

i) A request to the mobile unit 10 to discard any data that remains to be transmitted.

In regard to downlink control events it is noted that there is no requirement for downlink media access control, since only the base station 12 uses the downlink channel, whereas the uplink channel must be shared by all of the mobile units within the associated group. It is assumed that the base station 12 avoids transmitting slots to mobile units which are not members of the base unit's group. That is, the base station 12 will only transmit to mobile units 10 with which the base station 12 has an established link. For the downlink path therefore, the mobile unit 10 need only recognize slots 48 having the mobile unit's address within the field 48b.

Other downlink control events that are conveyed from the base station 12 to the mobile unit 10 upon the $CC_D$ channel may include, but are not limited to, the following.

a) Notification of an intention to transmit to a specific mobile unit 10 (n) slots of information.

b) Notification of the end of the transmission.

Uplink responses to these control events from the mobile unit 10 to the base station 12 include the following.

a) Acknowledgement of the receipt of a slot.

b) A request for re-transmission of a slot.

c) A request for a temporary suspension of data transmission due to, for example, a buffer full condition.

d) A request for a more rapid transmission of slots. A base station 12 response to this uplink control event may be to allocate more time slots 48 within a frame to the requesting mobile unit 10.

e) A request for a less rapid transmission of slots. A base station 12 response to this uplink control event may be to allocate fewer time slots 48 within a frame to the requesting mobile unit 10.

The above mentioned uplink and downlink control events and responses are substantially independent of the wireless network implementation. For example, the control messages could be carried in the same bit stream as the packets of data. However, when high bandwidth data channels are required the inherent unreliability of such a high bandwidth channel makes the inclusion of control information on the channel disadvantageous for the reasons previously discussed.

In summary, the wireless optical network taught by the invention overcomes the problem of establishing and maintaining high-bandwidth communication via an unreliable medium by separating the control channel from the data channel. In that the control channel requires a much smaller bandwidth than the data channel the propagation problems mentioned above are avoided. The control channel bandwidth can be made significantly smaller because, at most, one control message per data slot is required with the required control message being, at most, but a few hundred bits as compared to several thousand for a typical TCP/IP frame. Also, by employing a slotted TDMA transmission method with preassigned slots control messages are only required to initially establish a transmission and, thus, the number of control messages per transmitted slot may be less than one.

Other advantages made possible by the teaching of the invention include but are not limited to the following.

The low-bandwidth diffuse IR optical link may have greater range or sensitivity, whereas the broad-band data channel optics are preferably made directional and require line-of-sight access to the base station 12 in order to maximize the received signal strength and to reduce multi-path propagation problems. As such, the communication link establishment process may be begun early in the approach of the mobile unit 10 to the base station coverage region. For example, in FIG. 2 the mobile unit 10e may begin the link establishment procedure at the indicated position while not yet within but approaching the data coverage region 42d of the associated base station 12.

Also, the longer-range diffuse IR control channel enables the control channel to maintain contact as the mobile unit 10 moves out of range of the base station 12, thereby permitting a more controlled handoff mechanism.

A handoff procedure is disclosed in copending and commonly assigned U.S. patent application Ser. No. 07/605,720, filed Oct. 29, 1990, entitled "Handoff Method and Apparatus for Mobile Wireless Workstations" by Colin Harrison.

Another advantage of the use of the separate low-bandwidth control channel is that it enables the mobile units 10 and the base station 12 to maintain contact temporarily even though the data channel is lost due to a momentary obstruction. This substantially reduces the communication overhead involved in losing a connection and then reestablishing it. This latter problem may be one of the limiting features of a wireless mobile network and is avoided if possible.

Furthermore, the control channel transmission rate can remain fixed while the data channel transmission rate may increase due to advances in network adapters and components. Thus, adapters with different data link speeds are enabled to coexist within a network.

The separate control channel can also be employed as a simplified connection method for low-cost, low-bandwidth devices, such as simple printers, where the additional cost for high-bandwidth data channel devices may not be justified. In FIG. 1 the unit 10' may be such a printer that communicates with the wireless network only through the low-bandwidth $CC_U$ and $CC_D$ channels. Of course, a printer may be fixed in a given position within a base station 12 coverage area and not moved about, although no such restrictions are placed upon printer position.

Preferably the data channels occupy the modulation spectrum above 400 kHz and extend up to 1-10 MHz. The control channels occupy the modulation spectrum from approximately two kHz to approximately 300 kHz. In the embodiment of FIG. 3 the control and data channel signals are separated after the photodetector RD by electrical filtering. Each channel has its own receiver. Due to the lower bandwidth the control channel receiver (CR 40b) is less complex than the data channel receiver (DR40d). However, the data channel control logic is less complex than that of the control channel since only address recognition is required.

In operation, a mobile unit 10 seeking a base station 12 transmits a request for connection on the control channel by using maximum optical power. Since the control channel is separate from the data channel, this asynchronous transmission does not interfere with uplink data transmission that may be in progress between the base station 12 and another mobile unit 10, although it may interfere with ongoing uplink control signals being generated by another mobile unit 10.

The access mechanism for the uplink control channel is preferably a relatively simple ALOHA protocol of a type known in the art. This permits asynchronous requests for connection by an approaching mobile unit 10 to be handled in the same manner as requests from the existing group members. To improve the "fairness" of the ALOHA access under near/far conditions, the mobile units 10 have controllably variable power levels for the control signal transmission.

After the new mobile unit 10 is added to the base station 12 group the newly added member of the group is enabled to exchange control messages with the base station 12 using the uplink and downlink control channels.

The downlink control channel is broadcast to all mobile units within the group and the control slot 48 address field 48b enables only the addressed mobile unit(s) to identify their control messages. The downlink data channel is also broadcast to all mobile units within the group and the corresponding data slot 48 address field 48b enables only the addressed mobile unit(s) to identify their data streams.

The newly added mobile unit 10 synchronizes with the data link slot sequence by being assigned one slot number by the base station via the control channel. Thereafter the mobile unit 10 is expected to internally keep track of slot numbers, although it can request to be assigned a slot any number of times. The uplink and downlink paths employ the same set of slot numbers. A mobile unit 10 which has been authorized to use the uplink path waits for the beginning of its authorized slot before sending data. A mobile unit 10 which has been instructed, via the control channel, to expect one or more packets of data from the downlink waits for the specified slot to occur and then begins to capture the information conveyed by that slot. A mobile unit can thus receive and transmit using a single assigned control or data slot.

The base station 12 buffers within the memory 28 data received from the wired network or from the uplink data channel. Data packets are transmitted in the order received within specified priority levels. The base station 12 refrains from transmitting except when it has data or control information to broadcast.

Implementation of the diffuse command channel in the receiver and transmitter of the mobile unit 10 and base station 12 depends strongly on the optical collection mechanisms employed for the high-speed data channel. The data channel preferably has some directionality associated therewith to overcome multi-path effects and to increase light collection. If optical devices such as lenses or mirrors are employed, which tend to reduce the acceptance angles of the transmitters and detectors, insufficient diffuse infrared light may be produced or received when a line-of-sight relationship does not exist between the mobile unit 10 and the base station 12.

To overcome this problem it is desirable to employ for the diffuse control channel separate infrared transmitters and detectors that do not use optical devices to narrow the field of view. The two channels (control and data) then have separate receivers. Preferably the control channel receiver (30b or 40b) uses a bandpass filter to exclude ambient light noise below 300 kHz and the data channel signals above 1 MHz. The data channel receiver (30d or 40d) uses a bandpass filter from approximately 400 kHz up to, for example, 20 MHz.

Since the control channel transmission rate is relatively low (50 k Bit/s) the associated receiver and clock recovery requirements are relatively simple; although a finite state machine or similar means may be required to achieve real-time link control. Since the data channel transmission rate is high, for example 10M Bit/s, the associated receiver and clock recovery requirements are more complex. However, the data channel requires only a relatively simple finite-state machine or similar means to recognize the associated address. If separate infrared emitters, such as TD1 and TD2, are employed it is preferable to include bandlimiting filters to match the characteristics of the associated receivers. In this case it is also desirable to employ different wavelengths for the control and data links. This results in a total of four wavelengths for implementing the wireless link, that is, two each for the uplink and the downlink paths.

If the acceptance angles of the transmitters and detectors are not too narrow it may be preferable to connect the two receivers to the same detector and the two transmitters to the same emitter, as depicted in FIG. 1c.

Other advantages made possible by the teaching of the invention include the following.

In that the collision resolution of media access takes place in the control channel, and since the mobile unit 10 and the base station 12 agree on data channel slot usage, slots in the data channel are never wasted by collisions. In principle every data channel slot can be effectively used, thus achieving the highest efficiency.

On leaving the coverage region of a base station 12 the mobile unit 10 is enabled to signal its departure on the command channel to the base station 12, rather than simply "disappearing". This gives the base station 12 an opportunity to begin buffering or redirecting frames addressed to the departing mobile unit 10. Details of this procedure are disclosed in the aforementioned commonly assigned U.S. patent application Ser. No. 07/605,720, filed Oct. 29, 1990, entitled "Handoff Method and Apparatus for Mobile Wireless Workstations" by Colin Harrison.

Furthermore, the separation of the control channel from the data channel enables network adapters having various data channel transmission and receive rates to coexist. The control channel, having standardized transmission and receive rates, provides a means for the mobile unit 10 and the base station 12 to determine the data transmission rate.

It is noted that control functions associated with the command and data channels, and also other logic required to operate the wireless link, may be implemented in software executed by the processors 26 and 32. Alternately special purpose logic may be incorporated to realize these functions or some combination of these approaches may be employed. For some applications the processor and modulator and receiver circuits may all be implemented within a suitably programmed digital signal processor integrated circuit.

Although the invention has been described thus far in the context of separately employed uplink and downlink channels having differing propagation characteristics it should be realized that various permutations of same are also within the scope of the teaching of the invention.

For example, in a situation where the data channel is inoperable due to, for example, an obstruction within the line-of-sight between the base station 12 and a mobile unit 10, data transmission can be made to "fallback" to the diffuse transmission channel. Although the transmission rate may be appreciably slower, the link to the LAN 16 is not broken. Such a fall-back situation can be readily signalled from the base station 12 to the mobile unit 10 via a downlink control channel event after which the mobile unit 10 interprets subsequent diffuse channel receptions as data instead of command information.

As another example, for an application where uplink data transmissions are expected to be infrequent and of short duration the high speed uplink channel can be eliminated altogether and all uplink traffic, both command and data, is conveyed by the low speed diffuse channel. One such application is where the primary source of uplink data is expected to be keystrokes generated by an operator of the mobile unit 10. For this case the high bandwidth uplink channel may be eliminated without significantly impacting response time or other user-noticeable system functionality.

Thus, while the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. A method of operating a wireless optical communications system having at least two communicating entities, comprising the steps of:
   providing each of the at least two communicating entities with first means for transmitting and for receiving information over a first wireless optical channel and with second means for transmitting and for receiving information over a second wireless optical channel such that each of the at least two communicating entities are capable of bidirectional communication over the first wireless optical channel and over the second wireless optical channel, wherein each of the first means for transmitting and receiving information operates at a first wavelength and a first data bit rate, wherein each of the second means for transmitting and receiving information operates at a second wavelength and at a second data bit rate, and wherein the first wavelength is longer than the second wavelength and the first data bit rate is less than the second data bit rate;
   transmitting communication link control information from a first entity to a second entity over the first wireless optical channel at the first data bit rate; and
   responsive to the transmitted communication link control information that is received over the first wireless optical channel, transmitting data information from the second entity to the first entity over the second wireless optical channel at the second data bit rate, wherein the communication link control information is transmitted with a bandwidth that is less than a band width with which the data information is transmitted.

2. A method as set forth in claim 1 wherein the first optical channel is a diffuse transmission infrared radiation channel and wherein the second optical channel is a line-of-sight infrared radiation channel.

3. A method as set forth in claim 1 and further comprising the steps of receiving the transmitted data information with the first entity and re-transmitting the received data information form the first entity to a conductor coupled to a communications network.

4. A method as set forth in claim 3 and further comprising the steps of:
   transmitting communication link control information from the second entity to the first entity with the first optical channel; and
   responsive to the transmitted communication link control information, transmitting data information other than communication link control information from the first entity to the second entity with the second optical channel, the step of transmitting the data information including the initial steps of receiving the data information from the network with the first entity; and buffering the information received from the network within the first entity.

5. A method as set forth in claim 2 wherein the second optical channel transmits with a modulation spectrum within a range of approximately 400 kHz to approximately 10 MHz, and wherein the first optical channel transmits with a modulation spectrum within a range of approximately 2 kHz to approximately 300 kHz.

6. A method as set forth in claim 1 wherein the first and the second optical channels each employ a TDMA technique having a repetitively transmitted data frame comprised of a plurality of slots, each slot comprising a plurality of fields including a data field.

7. A method as set forth in claim 6 wherein the step of transmitting communication link control information includes a step of transmitting an identification of at least one slot that is assigned to the second entity for transmitting the date information therein.

8. An optical communication system comprising at least one network adapter means coupled to a network and at least one data processing means optically coupled through a wireless link to the network adapter means, wherein the network adapter means and the data processing means each comprise means for transmitting and for receiving information with one another through a first, diffuse transmission infrared radiation channel at a first bit rate, and wherein the network adapter means and the data processing means each further comprise means for transmitting and for receiving information with one another through a second infrared radiation channel having a second bit rate that is greater than the first bit rate, the network adapter means and the data processing means each further comprising means for transmitting and for receiving wireless link control information with one another through the first, diffuse transmission infrared radiation channel, the network adapter means and the data processing means each also comprising means for transmitting and for receiving data information, other than wireless link control information, with one another through the second infrared radiation channel.

9. An optical communication system as set forth in claim 8 wherein the second infrared radiation channel transmits with a modulation spectrum between approximately 400 kHz to approximately 10 MHz and wherein the first, diffuse transmission infrared channel transmits with a modulation spectrum within the range of approximately 2 kHz to approximately 300 kHz.

10. An optical communication system as set forth in claim 8 wherein the network adapter means and the data processing means each comprise means for transmitting and for receiving the wireless link control information with one another through the first, diffuse transmission infrared radiation channel with a slotted TDMA protocol, and wherein the network adapter means and the data processing means each also comprise means for transmitting and for receiving the data information, other than wireless link control information, with one another through the second infrared radiation channel also with the slotted TDMA protocol.

11. An optical communication system as set forth in claim 8 wherein the network adapter means and the data processing means each comprise means for buffering data information transmitted to or received from the wireless link.

12. An optical communication system as set forth in claim 8 wherein the data processing means includes a single infrared transmitting means for transmitting both the first, diffuse transmission infrared radiation channel and also the second infrared radiation channel.

13. An optical communication system as set forth in claim 8 wherein the data processing means includes a first infrared transmitting means for transmitting the first, diffuse transmission infrared radiation channel and further includes a second infrared transmitting means for transmitting the second infrared radiation channel.

14. An optical communication system as set forth in claim 8 wherein the data processing means includes a single infrared receiving means for receiving both the first, diffuse transmission infrared radiation channel and also the second infrared radiation channel.

15. An optical communication system as set forth in claim 8 wherein the data processing means includes a first infrared receiving means for receiving the first, diffuse transmission infrared radiation channel and further includes a second infrared receiving means for receiving the second infrared radiation channel.

16. An optical communication system comprising at least one network adapter means coupled to a network and at least one data processing means optically coupled through a wireless link to the network adapter means, wherein the network adapter means and the data processing means each comprise means for transmitting and for receiving information with one another through a first, diffuse transmission infrared radiation channel at a first bit rate, and wherein the network adapter means and the data processing means each further comprise means for transmitting and for receiving information with one another through a second infrared radiation channel having a second bit rate that is greater than the first bit rate, wherein the network conforms to a TCP/IP protocol.

17. In a wireless infrared link communication system comprising at least one network adapter means coupled to a network and a plurality of data processing means optically coupled through the wireless infrared link to the network adapter means, a method for communicating between the network adapter means and each of the data processing means, comprising the steps of:

transmitting and receiving communication control information through a first, diffuse transmission infrared radiation channel having a first bandwidth; and responsive to received communication control information, transmitting and receiving data information through a second infrared radiation channel having a second bandwidth that is greater than the first bandwidth.

18. A method as set forth in claim 17 and further comprising the steps of buffering within the network adapter means data information received from the network or from one of the data processing means.

19. A method as set forth in claim 17 and, in response to a condition wherein the second infrared radiation channel is not operable to transmit and receive the data information, further comprising a step of communicating the data information between the network adapter means and one or more of the data processing means only with the first, diffuse transmission infrared radiation channel.

20. In a wireless infrared link communication system comprising at least one network adapter means coupled to a network and a plurality of mobile data processing means optically coupled through the wireless infrared link to the network adapter means, a method of establishing communication between the network adapter means and one of the mobile data processing means, comprising the steps of:

before the mobile data processing means comes within operable communication range of the network adapter means through a first infrared data transmission channel, transmitting and receiving communication control information between the mobile data processing means and the network adapter means through a second, diffuse transmission infrared radiation channel; the control information including information for enabling the mobile data processing means to be assigned to an active group of mobile data processing means that is associated with the network adapter means; and after the mobile data processing means comes within operable communication range of the network adapter means through the first infrared data transmission channel, transmitting and receiving data information between the network adapter means and the mobile data processing means through the first infrared data transmission channel.

21. A network adapter for use in coupling a wired network to a wireless communication medium, the network adapter comprising:

means for coupling to the wired network; and means for coupling to the wireless communication medium, the coupling means including first means for transmitting and for receiving modulated optical radiation having a first bandwidth having diffuse propagation characteristics associated therewith, the modulated optical radiation that is transmitted and received with the first means including wireless communication medium control information; the means for coupling to the wireless communication medium further including second means for transmitting and for receiving modulated optical radiation having a second bandwidth that is greater than the first bandwidth, the modulated optical radiation that is transmitted and received with the second means including information other than wireless communication medium control information.

22. Network adapter means as set forth in claim 21 wherein the first means and the second means each operate within a range of optical wavelengths that is greater than approximately 700 nanometers.

23. Network adapter means as set forth in claim 21 wherein the second means includes means for transmitting with a modulation spectrum within a range of approximately 400 kHz to approximately 10 MHz, and wherein the first means includes means for transmitting with a modulation spectrum within a range of approximately 2 kHz to approximately 300 kHz.

24. A data processor for use with a wireless communication medium, the data processor comprising:
means for coupling the data processor to a wireless communication medium, including first means for transmitting and for receiving modulated optical radiation having a first bandwidth having diffuse propagation characteristics associated therewith, the modulated optical radiation that is transmitted and received with the first means including wireless medium communication control information; the means for coupling to the wireless communication medium further including second means for at least receiving modulated optical radiation having a second bandwidth that is greater than the first bandwidth, the modulated optical radiation that is received with the second means including information other than wireless communication medium control information.

25. Data processing means as set forth in claim 24 wherein the first means and the second means each operate within a range of optical wavelengths that is greater than approximately 700 nanometers.

26. Data processing means as set forth in claim 24 wherein the second means includes means for receiving optical radiation having a modulation spectrum within a range of approximately 400 kHz to approximately 10 MHz, and wherein the first means includes means for transmitting with a modulation spectrum within a range of approximately 2 kHz to approximately 300 kHz.

* * * * *